(No Model.) 2 Sheets—Sheet 1.

J. F. STEWARD.
GRAIN ADJUSTING DEVICE FOR SELF BINDERS.

No. 391,342. Patented Oct. 16, 1888.

Attest:
W. R. Kennedy
S. P. Hollingsworth

Inventor:
J. F. Steward.
By his Atty
Phil T. Dodge.

N. PETERS, Photo-Lithographer, Washington, D. C.

(No Model.) 2 Sheets—Sheet 2.

J. F. STEWARD.
GRAIN ADJUSTING DEVICE FOR SELF BINDERS.

No. 391,342. Patented Oct. 16, 1888.

Attest
H. P. Hollingsworth
N. A. Kennedy

Inventor
J. F. Steward.
By his Atty
Phil T. Dodge

UNITED STATES PATENT OFFICE.

JOHN F. STEWARD, OF CHICAGO, ILLINOIS.

GRAIN-ADJUSTING DEVICE FOR SELF-BINDERS.

SPECIFICATION forming part of Letters Patent No. 391,342, dated October 16, 1888.

Application filed June 14, 1887. Serial No. 241,260. (No model.)

*To all whom it may concern:*

Be it known that I, JOHN F. STEWARD, of Chicago, in the county of Cook and State of Illinois, have invented certain new and useful Improvements in Grain-Adjusting Devices for Self-Binders, of which the following is a description, reference being had to the accompanying drawings, making a part of this specification.

Figure 1:
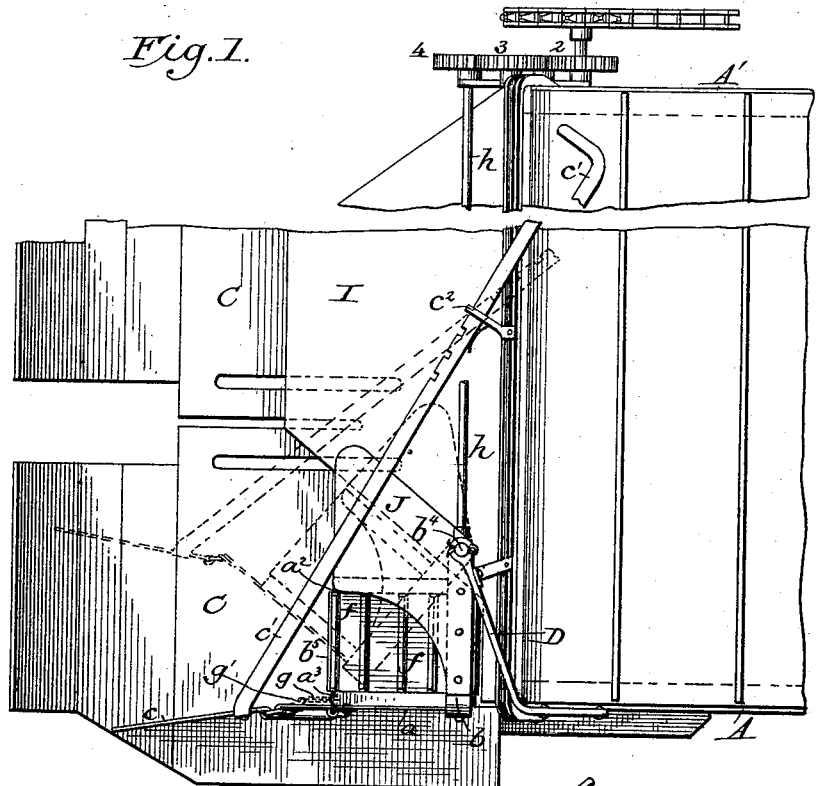
Figure 2:
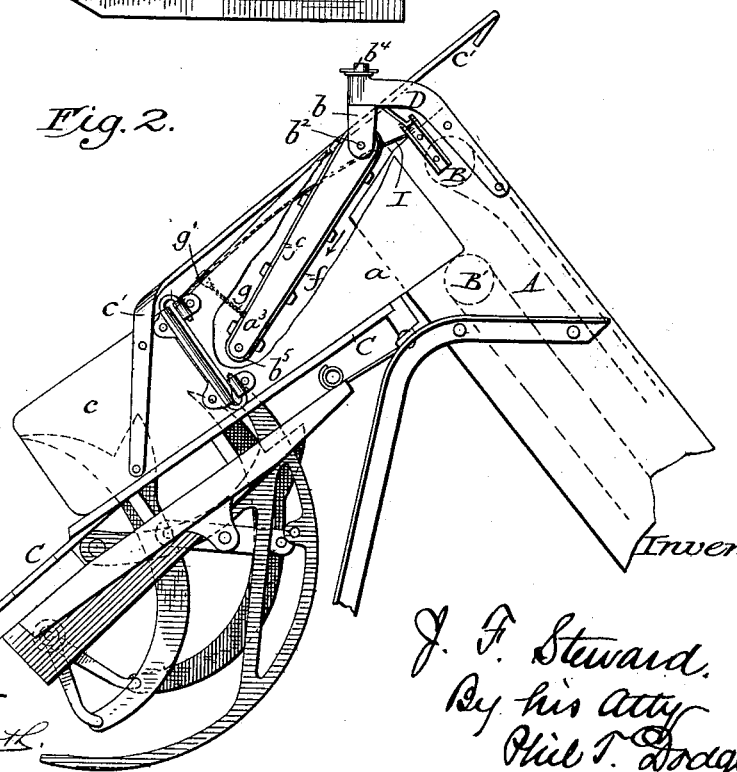
Figure 3:
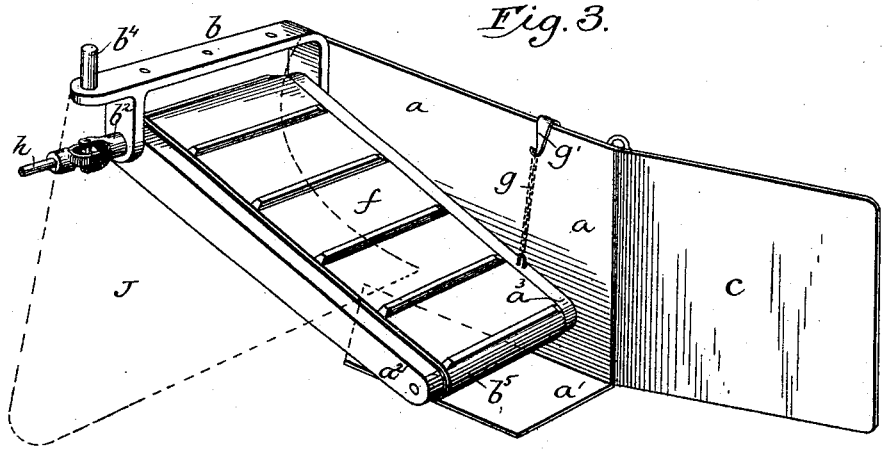
Figure 4:
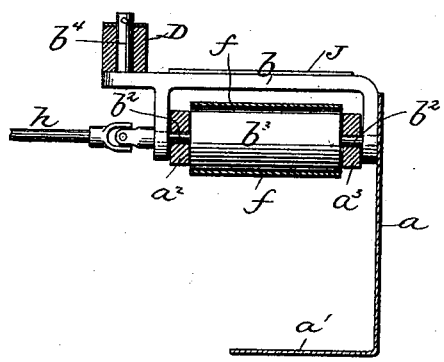

Figure 1 is a top plan view of the delivery side of a grain harvester and binder with my adjusting devices applied thereto, a portion of the harvester and binder-table being broken away to reduce the size of the figure. Fig. 2 is a front elevation of the same, a portion of the butt-board being broken away to expose the adjusting-apron. Fig. 3 is a perspective view of the adjusting devices detached from the machine. Fig. 4 is a vertical transverse section of the same on the line $x$ $x$.

My invention is applicable to various forms of grain-binders, but is shown in the accompanying drawings as applied to a self-binding harvester of the class in which the grain is lifted over the main wheel and delivered in a downward direction to a binder-receptacle located on the outer side.

In the drawings, A A' are the side boards of the harvester-elevator, and B B' the horizontal rollers located in the top of said frames and carrying the upper ends of the elevator-aprons, as usual.

C is the binder-table occupying its usual position below the outer ends of the elevating apparatus.

In applying my improvement I bolt rigidly to the top of the elevator frame or other suitable support an arm, D, one end of which extending rearward overhangs the upper edge of the grain-table, and is provided at some distance from the front of the machine with a vertical eye or socket. In this socket I mount the vertical pivot $b^4$ of a bracket-plate, $b$, which extends forward and is provided with two depending arms. In these arms I mount the shaft or journal $b^2$ of a horizontal roll, $b^3$, carrying the upper end of an endless apron, $f$, which is extended toward the delivery side of the machine overlying the binding-table and the butts of the loose grain thereon. The outer end of this apron is carried by the second roll $b^5$, the journals of which are supported in bearings in the bars $a^2$ $a^3$ of the usual apron-sustaining frame, which bars are sustained at their upper ends on the journal of the upper roll, this arrangement holding the apron in an extended position and permitting its outer end to float upon the grain passing beneath it. The apron mechanism as a whole being carried by the bracket, $b$, is free to swing horizontally around the axis $b^4$, so that the apron may be adjusted to travel in line with the side of the table to carry the grain forward in a straight line, or, as indicated by dotted lines in Fig. 1, to a position oblique to the side of the table and at a greater or less angle thereto, in order that it may act not only to move the grain forward or downward, but also to assist in shifting it endwise upon the table.

The journal of the upper roll is connected by a universal joint substantially coincident with the vertical journal $b^4$ to a shaft, $h$, which is extended rearward through a bearing on the frame and provided at its extremity with a driving-pinion, 4, which receives motion through intermediate pinions, 3 2, from a pinion on one of the elevator-rolls, this arrangement imparting a positive and constant motion to the aprons in the direction indicated by the arrow in Fig. 2.

To the swiveling arm or bracket $b$, I connect rigidly a metallic butt plate or board, $a$, which extends downward in a vertical direction adjacent to and parallel with the front side of the apron-frame in position to act against the butts of the grain flowing under the apron. This plate, technically termed a "butt-board," partakes of the swinging motion of the bracket $b$ and maintains its relation to the side of the apron, so that it serves at all times to guide the butts of the grain in the path in which they are urged by the under surface of the apron. At its lower edge I provide the butt-board $a$ with a horizontal extension, $a'$, extending rearward and lying upon or immediately above the surface of the binding-table, so that the butts of the grain will ride thereover. This plate becomes speedily polished and allows the grain to move more freely than over the wooden surface of the table. It also prevents the ends of the grain from riding beneath and being retarded by the lower edge of the butt-board.

To the outer or lower end of the butt-board *a*, I connect by an upright joint or hinge a plate or wing, *c*, forming a continuation thereof, and designed to act, like the similar boards now in use, against the butts of the grain to prevent the same from changing its longitudinal position after it has been properly placed by the butt-board and apron. To this extension *c*, I secure rigidly one end of an adjusting-bar, *c'*, which is carried rearward and upward across the top of the elevator-frame to such point that it may be conveniently grasped and operated by the attendant while in his customary seat. This bar is provided with notches in its edge and extends through the stationary guide-plate *c²*, with which it may engage to secure it in position. As the bar *c'* is moved endwise, it adjusts the plate *c* forward or backward over the binding-table, causing the plate at the same time to swing the butt-board *a* and the apron around the axis *b⁴*. In order to control the descent of the adjusting-apron and prevent it from coming in contact with the surface of the binding-table, I provide it with a sustaining-chain, *g*, which may be engaged with a hook, *g'*, attached to the upper edge of the butt-board.

In place of the shaft *h* and the universal joint for driving the adjuster-apron any equivalent driving mechanism may be employed.

In practice I find that the devices herein described enable me to place the grain, whether long or short, in such relation to the binder that it will be bound midway of its length. I also find that, unlike the grain-adjusting devices now in general use, the mechanism herein shown will deal successfully with grain which are presented at an angle to the line of the cutter-bar.

The machine is provided, as usual, with a stationary apron or wind-guard, I, overlying the heads of the grain. This is cut away at the front in such manner as to permit the swinging motion of the adjusting devices, and the bracket *b* of the adjuster provided with a plate, J, fixed thereto in position to overlie the grain and serve as a continuation of the apron I. The form and position of this plate are clearly shown in full lines in Figs. 1, 2, and 4, and in dotted lines in Fig. 3.

Having thus described my invention, what I claim is—

1. In combination with the bracket movable around an upright axis, the butt-board attached thereto and movable therewith, and the apron-sustaining frame jointed to the bracket to swing vertically at one end.

2. In a grain harvester and binder, the bracket *b*, connected by a vertical axis to the harvester, in combination with the endless conveyer-apron and its frame connected by horizontal journals to the bracket and overlying the grain table or chute in position to act on top of the butts of the grain.

3. In combination with the grain-table, the overlying endless apron and its supporting-frame mounted to swing both vertically and horizontally, the adjacent butt-board, also mounted to swing horizontally, and the adjustable chain or suspension device connecting the end of the apron-frame with the butt-board.

4. The bracket pivoted to turn horizontally, and the butt-board rigidly secured thereto, in combination with the endless apron arranged to act transversely on the grain-stalks, its supporting-frame connected by horizontal journals to the bracket, the plate *f*, jointed to and forming a continuation of the butt-board, and the adjusting-bar attached to said plate.

5. The conveyer-apron overlying the grain-passage and the horizontally-turning bracket sustaining the driving-roll *b³* of said apron, in combination with the shaft *h*, connected at one end to the shaft of the roll *b³* by a universal joint, and geared at the opposite end to one of the elevator-rolls of the harvester, whereby the elevator-roll is rendered available for driving the overlying apron and the latter permitted to swing both vertically and laterally while in motion.

6. In a grain-binder, the adjustable swinging butt-board, in combination with a plate attached thereto to underlie the butts of the grain, and the conveyer to act on top of the grain and arranged to swing with the butt-board, whereby the three grain-controlling surfaces are enabled to move horizontally and retain their relative positions.

JOHN F. STEWARD.

Witnesses:
W. L. MILES,
T. G. STALLSMITH.